April 14, 1953 S. PAKSWER 2,635,203

COLOR TELEVISION TUBE

Filed Jan. 2, 1951 2 SHEETS—SHEET 1

INVENTOR.
SERGE PAKSWER
BY Francis W. Crotty
HIS ATTORNEY

April 14, 1953 S. PAKSWER 2,635,203

COLOR TELEVISION TUBE

Filed Jan. 2, 1951 2 SHEETS—SHEET 2

INVENTOR.
SERGE PAKSWER
BY Francis W. Crotty
HIS ATTORNEY

Patented Apr. 14, 1953 2,635,203

UNITED STATES PATENT OFFICE 2,635,203

COLOR TELEVISION TUBE

Serge Pakswer, Elmhurst, Ill., assignor to The Rauland Corporation, a corporation of Illinois Application January 2, 1951, Serial No. 203,816

6 Claims. (Cl. 313—70)

Figure 1:
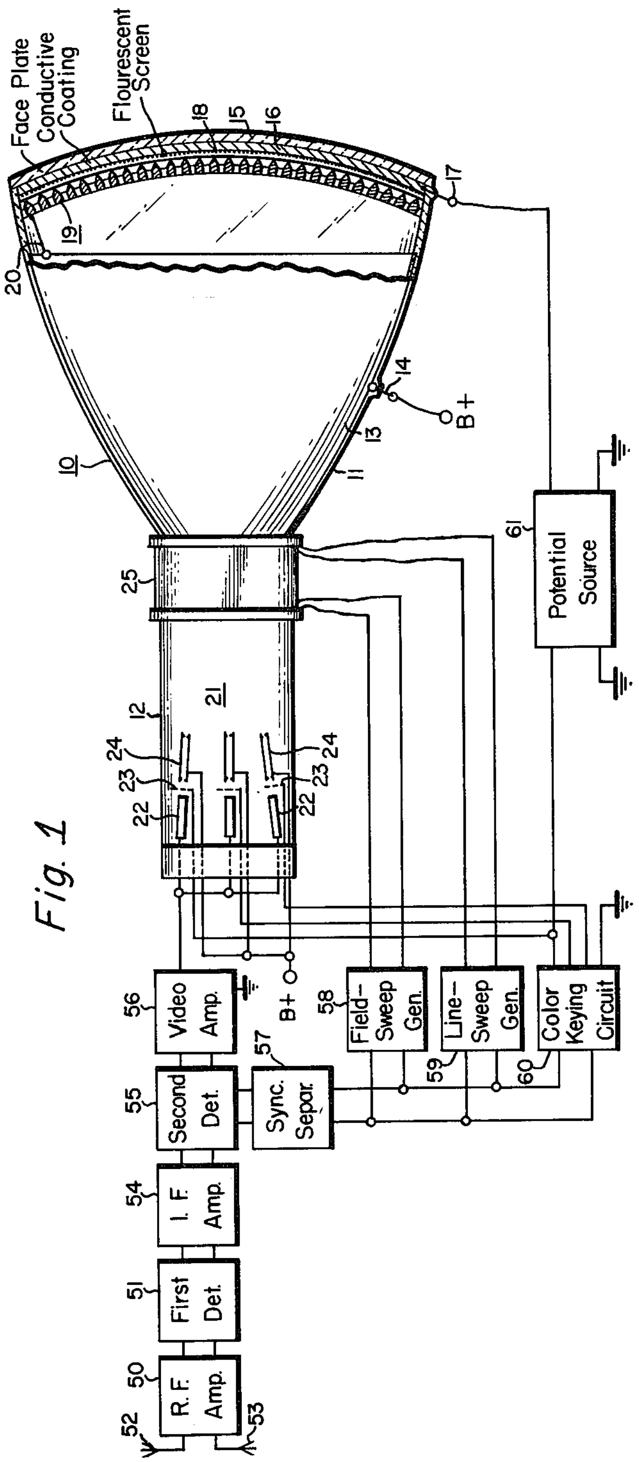

This invention relates to cathode-ray tubes of the type used in television systems and more particularly to cathode-ray tubes for use in a color television system to translate images in natural color.

Color television systems have been proposed in which successive fields of the video components of a television signal represent various selected primary colors of the televised image in a repeating sequence. Such systems are often referred to as being of the "field-sequential" type. Other systems, commonly referred to as "line-sequential" or "dot-sequential," have been proposed in which successive lines of video components, or successive portions of each line, represent a repeating sequence of the primary colors. It is usual practice to utilize three primary colors in the above systems, these colors corresponding substantially to green, blue and red.

Many types of cathode-ray video-signal translating devices are known to the art for operation in the above-mentioned color television systems. One well-known arrangement for use in field-sequential systems comprises a cathode-ray image-reproducing device having a color-filter disc associated therewith. The disc comprises a series of light filters each adapted to translate light in one of the selected primary colors, and the disc is rotated to place the light filters sequentially between the fluorescent screen and an observer in time coincidence with the sequentially received color fields of the television signal. One of the chief disadvantages of this type of system is that it entails mechanical moving elements of cumbersome physical dimensions.

Cathode-ray image-reproducing devices have also been proposed for use in line-, dot- or field-sequential color systems which do not require such moving elements, and which operate completely electronically to reproduce a televised image in full color. These latter devices usually comprise a target electrode consisting of various portions each adapted to emit light in one of the selected primary colors upon impingement by an electron beam. These devices further include some means for directing an electron beam or several electron beams developed therein to the various portions of the electrode in time coincidence with the sequentially received color fields, dots or lines of the television signal. Such devices for the most part are difficult to construct. Moreover, problems have been encountered in maintaining accurate registration between the electron beams and the various color portions of the target electrode during each of the sequentially received color fields, dots or lines.

The present invention provides an improved cathode-ray video-signal translating device for use in a sequential color television system, which is relatively simple to construct and by means of which the aforementioned problem of color registration is minimized. The device of this invention comprises an envelope which may consist of a neck portion, a conical portion, and a transparent viewing plate affixed to the large end of the conical portion. A transparent conductive coating is affixed to the internal surface of the viewing plate, and a sensitized screen is applied over the conductive coating, the sensitized screen having a preselected color characteristic corresponding to one of the selected primary colors of the system in which the device is to be used. The translating device further comprises a grid structure mounted therein adjacent the screen and composed of a plurality of conductive elements, each having two separate surfaces facing and inclined to the screen. One of the surfaces of each of these elements is coated with a sensitized screen material having a color characteristic corresponding to a second of the primary colors, and the other surface of each of these elements is coated with a sensitized screen material having a color characteristic corresponding to the third one of the selected primary colors.

An electron source is mounted at the end of the neck portion of the envelope remote from the sensitized screen, and this source develops a cathode-ray beam, or a plurality of beams, and directs them toward the screen. The device has means associated therewith for controlling the beams so that they are directed towards the sensitized screen from various angles, and at the same time the potential of the conductive coating is varied relative to the potential of the grid. The control of the cathode-ray beams and the variation in the relative potential between the conductive coating and grid is synchronized with the received television signal so that the beams are directed, in a manner to be described, sequentially to the screen and to the various surfaces of the grid structure elements in coincidence with the sequentially received color fields, lines or dots of the television signal. In this manner an image may be reproduced by the tube in natural color.

It is accordingly an object of this invention to provide an improved video-signal translating device for use in a color television system.

A more particular object of the invention is to provide an improved image-reproducing device for use in line-, field- or dot- sequential types of color television systems for reproducing images in natural color.

A further object of the invention is to provide an improved image-reproducing device wherein an image is reproduced in a repeating sequence of selected primary colors without the need for color filter discs or other mechanically movable elements.

A still further object of the invention is to provide an improved image-reproducing device which is relatively simple in construction, yet which operates efficiently to reproduce images in natural color.

Figure 2:
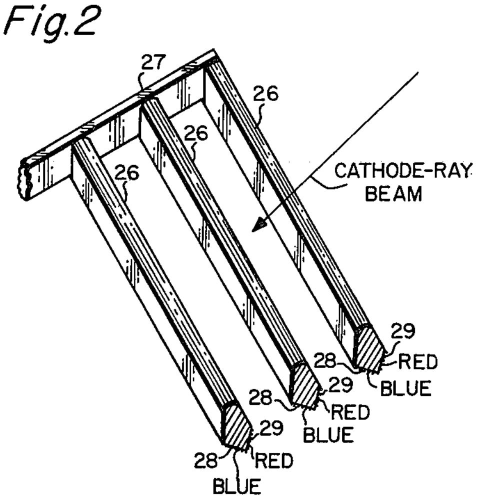
Figure 3:
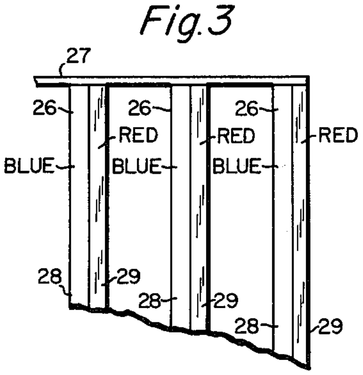
Figure 4:
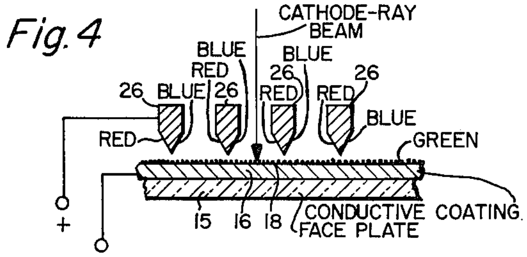
Figure 5:
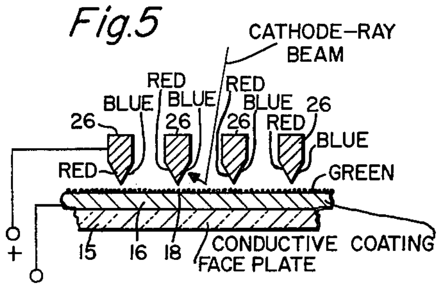
Figure 6:
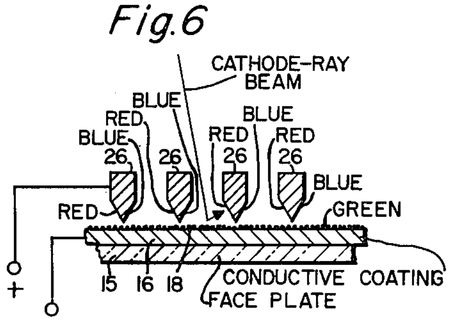

The features of this invention which are believed to be new are set forth with particularity in the appended claims. The invention itself, however, together with further objects and advantages thereof may best be understood by reference to the following description when taken in conjunction with the accompanying drawings, in which:

Figure 1 shows a video-signal translating device constructed in accordance with the invention and included in a television receiver, Figure 2 is a perspective view on a greatly enlarged scale of a portion of a grid structure incorporated in the translating device of Figure 1, Figure 3 shows another view of a portion of the grid structure, also on a greatly enlarged scale, and, Figures 4–6 are diagrams illustrating the operation of the video-signal translating device of the invention.

Referring now to Figure 1, the video-signal translating device or cathode-ray tube 10 illustrated therein comprises an envelope having an enlarged or conical portion 11, and further having an elongated or neck portion 12. The conical portion 11 may be formed of glass or other vitreous material, in which case an internal conductive coating 13 is usually applied thereto and acts as an accelerating or anode electrode for the cathode-ray beams developed within the device. Contact may be made with conductive coating 13 by means of a terminal 14 extending through the side of conical portion 11, this terminal being connected to the positive terminal B+ of a source of unidirectional potential.

A transparent face plate 15 is sealed to the large end of conical portion 11, and the face plate has a transparent conductive coating 16 applied to its internal surface. Conductive coating 16, as is well known, may be formed of decomposed tin chloride or indium chloride and may be coated on the face plate 15 by spraying a solution of these products on the face plate, the face plate having previously been heated to a temperature of about 500° C. It is essential that this coating be transparent to the various light colors developed in the manner to be described, behind it within the tube. Connection may be made to conductive coating 16 by means of a terminal 17 extending through the side of conical portion 11.

A sensitized screen 18 which emits light of a preselected color in response to electron bombardment is deposited on the conductive coating. As is usual practice, face plate 15 has a convex shape and a predetermined radius of curvature. The focal point of this radius is preferably located at a point referred to in the art as the "effective center of deflection."

The cathode-ray tube further includes a grid structure 19 mounted adjacent screen 18 and electrically connected to conductive coating 13 by means of a suitable connection 20. Grid structure 19 has a convex shape and is concentrically connected with the convex face plate 15 so that their focal points are coincident. This grid structure may comprise a plurality of conductive rods 26, as shown more clearly in Figures 2 and 3. These rods may be held in position by means of a conductive cross-bar 27 at one extremity, and a similar cross-bar at the other extremity but not shown. Additional cross-bars of conductive material may be necessary to give sufficient rigidity to the grid structure. Each conductive rod 26 has a pair of surfaces 28, 29 facing and inclined to screen 18. All the surfaces 28 have a similar inclination to the screen and are coated with a fluorescent material adapted to emit light of one of the primary colors in response to the impingement of an electron beam. Likewise, all the surfaces 29 have the same inclination to screen 18, and are coated with a material adapted to emit light corresponding to another of the primary colors upon impingement by an electron beam. Grid rods 26 may extend either vertically or horizontally, that is, they may extend in the field-scanning or line-scanning direction, and for convenience it will be assumed that they are vertically disposed.

It is also to be understood that although the video signal translating device of this invention is suitable for image reproduction and has been described as such herein, the device may also be used in a color television transmitter as an iconoscope. When so used it is merely necessary that faces 28, 29 and screen 18 be constructed of a color-selective photosensitive material, and be capable of developing video signals upon scansion by the cathode-ray beam or beams.

When used in conjunction with a 12-inch reproducing tube in a field-sequential system for example, the grid structure may comprise approximately 405 conductive rods each having the following dimensions:

| | Inches |
|---|---|
| Length | 10 |
| Maximum thickness | .0125 |
| Surface (28, 29) width | .0088 |
| Spacing between rods | .00618 |

For a line-sequential system, the grid structure may comprise 525 horizontal conductive rods, each having the following dimensions:

| | Inches |
|---|---|
| Length | 10 |
| Maximum thickness | .0095 |
| Surface (28, 29) width | .00675 |
| Spacing between rods | .00476 |

Moreover, for optimum results, the inclination of surfaces 28, 29 to screen 18 should be of the order of 45°. The sensitized materials may be deposited on surfaces 28, 29 by any well-known settling or spraying process.

For the three-color system, it is preferred that surfaces 28 of conductive rods 26 be coated with a fluorescent material emitting blue light, and surfaces 29 be coated with a fluorescent material emitting red light. Moreover, it is preferred that screen 18 be composed of a fluorescent substance such as willemite, to exhibit a green color characteristic. In this manner, surfaces 28 and 29 contribute the red and blue color components of the reproduced image, whereas screen 18 contributes the green color component. It is preferred that the green color be contributed by the screen, rather than the aforementioned surfaces, since the green color is in the spectral region of greatest eye sensitivity and must therefore be more thoroughly distinguished than the other two colors. Willemite is an advantageous screen substance since it does not materially absorb red or blue radiations. Flourescent screen 18 should be thin or even discontinuous so as to provide efficient transmission of both the red and blue light emitted by rods 26 behind the screen. It is apparent that the screen may be deposited on conductive coating 16 by means of settling, silk screening, or any other well-known process.

Device 10 further includes an electron source 21 mounted at the end of neck portion 12 remote from screen 18. The electron source may take the form of a plurality of electron guns which are mounted so that the various cathode-ray beams developed thereby are directed through apertures in grid 19 towards screen 18 with various angles of incidence. Each of the guns includes a cathode 22, a grid or control electrode 23, and an accelerating electrode 24. It is within the scope of the invention that a single cathode-ray beam be developed within the tube and be controlled to be directed to screen 18 with an angle of incidence that is varied in synchronism with the received color fields. The electron beams developed within device 10 may be scanned over screen 18 in a series of fields of parallel lines by means of a deflection yoke 25 of any well-known construction.

Assume that one electron beam from source 21 is directed to screen 18 with normal incidence as shown in Figure 4; that another is directed with an angle of incidence inclined to the right as shown in Figure 5; and that the third reaches the screen with an angle of incidence inclined to the left as shown in Figure 6. The various beams are modulated, in a manner to be described, with the video intelligence of a received color television signal and at the same time blanking pulses may be applied to the several electron guns of source 21 so that only one beam is developed within the tube at any particular time. These blanking pulses are synchronized and phased with the sequentially received color fields of the television signal so that the image reproduction contributed by each beam is accurately correlated with the color information of the televised subject. To this same end, the potential of conductive coating 16 is varied from time to time. The potential variation of conductive coating 16 is such that during the reception of a green color field of the television signal, the conductive coating is at nearly the same potential as, or even positive with respect to grid 19, but during the reception of a blue or red field of the television signal the potential of the conductive coating is less positive than the grid.

The blanking sequence of the beams is synchronized and phased so that, as shown in Figure 4, during the reception of a signal representing the green-color field only the beam which strikes the screen with normal incidence is developed within cathode-ray tube 10 and at the same time, conductive coating 16 is established at a potential equal to or greater than the potential of grid 19 so that the beam is directed to fluorescent screen 18 causing it to emit green light. During intervals wherein a signal representing the blue-color field is received, only the right-inclined beam is developed within the device, and at that time conductive coating 16 is established at a less positive potential than grid 19 so that the beam is repelled from screen 18 and is directed to the fluorescent surfaces 28 of elements 26, causing them to emit blue light. Finally, during intervals wherein a signal representing a red color field is received, only the left-inclined beam is developed within the device, and at that time conductive coating 16 is again established at a less positive potential than grid 19 to direct the beam to the surfaces 29 of elements 26, causing them to emit red light.

In this manner, device 10 reproduces a received television image in a sequence of three primary colors recurring in time coincidence with a similar recurring sequence of color fields in a received television signal. The device, therefore, reproduces a televised image in full color insofar as it affects the eye of an observer.

The color television receiver of Figure 1 comprises a radio-frequency amplifier 50 of one or more stages having output terminals connected to a first detector 51 and input terminals connected to a suitable antenna circuit 52, 53. First detector 51 is connected to an intermediate-frequency amplifier 54 of any desired number of stages which has output terminals connected to a second detector 55. Second detector 55 is connected through a video amplifier 56 to cathodes 22 of device 10 which are connected together.

Second detector 55 is further connected to a synchronizing-signal separator 57 which, in turn, is connected to a field-sweep generator 58 and a line-sweep generator 59. The output terminals of sweep generators 58, 59 are connected respectively to the field- and line-deflection elements included in yoke 25. Synchronizing-signal separator 57 is further connected to a color keying circuit 60 of well-known construction, the output terminals of which are connected to the various control electrodes 23 associated with the electron guns of device 10. Keying circuit 60 is also connected to a potential source 61 which, in turn, is connected to terminal 17 of conductive coating 16.

A color television signal intercepted by antenna 52, 53 is amplified in radio-frequency amplifier 50 and heterodyned to the selected intermediate frequency of the receiver in first detector 51. The resulting intermediate-frequency signal is amplified in amplifier 54 and detected in second detector 55 to produce a composite video signal. The video signal is amplified in video amplifier 56 and applied to cathodes 22 of device 10 to modulate the electron beams developed therein in accordance with the video intelligence. The synchronizing components of the composite video signal are separated therefrom in separator 57 and applied to sweep generators 58, 59 to control the line and field scansions of device 10 in synchronism with the received signal.

Assuming that the receiver is operating in a field sequential type of color television system, the various color characteristics of the televised image are represented in a repeating sequence of color fields. Each sequence is usually preceded by a color synchronizing component, and these components are utilized in well-known manner to actuate keying circuit 60 and cause it to generate blanking pulses appropriately phased relative to the sequentially received color fields so that only a beam corresponding to a received color field is generated within device 10 at any one time. The output terminal of keying circuit 60 connected to the green gun of device 10 is also connected to potential source 61. This enables the blanking pulses corresponding to the green color fields to key source 61 and turn it on for the duration of each of the green color fields. Potential source 61, preferably, supplies the D.-C. potential substantially equal to the potential applied to electrode 13 and grid 19. Therefore, for the duration of each green color field, conductive coating 16 is established at substantially the same potential as grid 19 so that the cathode-ray beam corresponding to the green fields impinges on fluorescent screen 18 as previously described. During the intervals of the red and blue fields, potential source 61 is turned off and conductive coating 16 is at a much lower potential than grid 19. Therefore, during the reception of these latter fields, the scanning cathode-ray beams of device 10 are directed to the appropriate surfaces of grid 19 in the previously discussed manner.

The invention provides, therefore, an improved video-signal translating device which is relatively simple and economical to construct, which does not require any mechanically moving elements, and which operates with a high degree of efficiency to emit light of a particular color during intervals in which the received signal corresponds to such color.

While a particular embodiment of the invention has been shown and described, modifications may be made and it is intended in the appended claims to cover all such modifications as may fall within the true spirit and scope of the invention.

I claim:

1. A cathode-ray video-signal translating device comprising: an envelope having a transparent face plate; a transparent conductive coating affixed to the inner surface of said face plate; a sensitized screen on one side of said conductive coating and having a selected color characteristic; a grid structure mounted within said device adjacent said face plate and composed of a plurality of elements each having separate sensitized surfaces facing and inclined to said screen, and each of said surfaces having a distinct color characteristic; an electron source mounted within said envelope remote from said sensitized screen for developing at least one cathode-ray beam and for directing said beam toward said screen; and means for controlling the potential level of said conductive coating relative to said grid to determine the impingement of said cathode-ray beam with respect to said sensitized screen and said surfaces of said elements.

2. A cathode-ray video-signal translating device comprising: an envelope having a transparent face plate; a transparent conductive coating affixed to the inner surface of said face plate; a sensitized screen coated on said conductive coating and having a preselected color characteristic; a grid structure mounted within said envelope adjacent said screen composed of a plurality of conductive rods each having separate sensitized surfaces facing and inclined to said screen, and each of said surfaces having a distinct color characteristic; an electron source mounted within said envelope remote from said sensitized screen for developing at least one cathode-ray beam and for directing said beam toward said sensitized screen; and means for controlling the potential level of said conductive coating relative to said grid to determine the impingement of said cathode-ray beam with respect to said sensitized screen and said surfaces of said rods.

3. A cathode-ray video-signal translating device comprising: an envelope having a transparent face plate; a transparent conductive coating affixed to the inner surface of said face plate; a sensitized screen coated on said conductive coating and having a preselected color characteristic; a grid structure mounted within said envelope adjacent said screen composed of a plurality of conductive elements each with separate sensitized surfaces facing and inclined to said screen, and each of said surfaces having a distinct color characteristic; an electron source mounted within said envelope remote from said sensitized screen for developing a plurality of cathode-ray beams and for directing said beams toward said sensitized screen from certain preselected angles; and means for controlling the potential level of said conductive coating relative to said grid to effect impingement of one of said beams on said sensitized screen and others of said beams on preassigned groups of said sensitized surfaces.

4. A cathode-ray image-reproducing device comprising: an envelope having a transparent face plate; a transparent conductive coating affixed to the inner surface of said face plate; a fluorescent screen coated on said conductive coating adapted to fluoresce in a preselected color; a grid structure mounted within said envelope adjacent said screen composed of a plurality of conductive elements each with separate sensitized surfaces facing and inclined to said screen, and each of said surfaces adapted to fluoresce in a distinct color; an electron source mounted within said envelope remote from said fluorescent screen for developing at least one cathode-ray beam and for directing said beam toward said fluorescent screen; and means for controlling the potential level of said conductive coating relative to said grid to determine the impingement of said cathode-ray beam with respect to said fluorescent screen and said sensitized surfaces of said elements.

5. A cathode-ray image-reproducing device comprising: an enevelope having a transparent face plate; a transparent conductive coating affixed to the inner surface of said face plate; a fluorescent screen coated on said conductive coating adapted to fluoresce in a preselected color; a grid structure mounted within said envelope adjacent said screen composed of a plurality of conductive elements each with separate sensitized surfaces facing and inclined to said screen, and each of said surfaces adapted to fluoresce in a distinct color; an electron source mounted within said envelope remote from said fluorescent screen for developing a plurality of cathode-ray beams and for directing said beams toward said fluorescent screen from certain preselected angles; and means for controlling the potential level of said conductive coating relative to said grid to effect impingement of one of said beams on said fluorescent screen and others of said beams on preassigned groups of said sensitized surfaces.

6. A cathode-ray image-reproducing device comprising: an envelope having a transparent face plate; a transparent conductive coating affixed to the inner surface of said face plate; a fluorescent screen coated on said conductive coating adapted to fluoresce in a selected one of three primary colors; a grid structure mounted within said envelope adjacent said screen composed of a plurality of elements each with two sensitized surfaces facing and inclined to said screen, and said surfaces adapted to fluoresce respectively in the other ones of said three primary colors; an electron source mounted within said envelope remote from said fluorescent screen for developing three cathode-ray beams and for directing one of said beams towards said screen with perpendicular incidence and the others with an inclined incidence relative to the plane of said screen; and means for controlling the potential level of said conductive coating relative to said grid to effect sequential impingement on said fluorescent screen and each of said sensitized surfaces by said cathode-ray beams.

SERGE PAKSWER.

References Cited in the file of this patent

UNITED STATES PATENTS

| Number | Name | Date |
|---|---|---|
| 2,224,324 | Van Steenis | Dec. 10, 1940 |
| 2,446,249 | Schroeder | Aug. 3, 1948 |
| 2,446,440 | Swedlund | Aug. 3, 1948 |
| 2,498,705 | Parker | Feb. 28, 1950 |
| 2,518,200 | Sziklai | Aug. 8, 1950 |
| 2,529,485 | Chew | Nov. 14, 1950 |
| 2,543,477 | Sziklai et al. | Feb. 27, 1951 |

OTHER REFERENCES

"RCA Direct-View Tri-Color Kinescopes," RCA Bulletins on Color Television and UHF, April 1, 1950 (pages 1-4 of Tri-Color Kinescope article contained therein), publ. by Radio Corp. of America, RCA Labts. Div.